(12) United States Patent
Mochizuki

(10) Patent No.: US 12,554,131 B2
(45) Date of Patent: Feb. 17, 2026

(54) HEAD-UP DISPLAY

(71) Applicant: KOITO MANUFACTURING CO., LTD., Tokyo (JP)

(72) Inventor: Kohei Mochizuki, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 340 days.

(21) Appl. No.: 18/266,425

(22) PCT Filed: Nov. 17, 2021

(86) PCT No.: PCT/JP2021/042271
§ 371 (c)(1),
(2) Date: Jun. 9, 2023

(87) PCT Pub. No.: WO2022/124028
PCT Pub. Date: Jun. 16, 2022

(65) Prior Publication Data
US 2024/0036311 A1    Feb. 1, 2024

(30) Foreign Application Priority Data

Dec. 9, 2020    (JP) .............................. 2020-204214

(51) Int. Cl.
*G02B 27/01*    (2006.01)
*B60K 35/10*    (2024.01)
(Continued)

(52) U.S. Cl.
CPC .......... *G02B 27/0101* (2013.01); *B60K 35/10* (2024.01); *B60K 35/211* (2024.01);
(Continued)

(58) Field of Classification Search
CPC .................................. G02B 27/01–2027/0198
(Continued)

(56) References Cited

U.S. PATENT DOCUMENTS

| 2014/0063359 A1 | 3/2014 | Chen |
| 2016/0282617 A1 | 9/2016 | Asai |

(Continued)

FOREIGN PATENT DOCUMENTS

| JP | 2006019027 A | * | 1/2006 |
| JP | 2017-151404 A | | 8/2017 |

(Continued)

OTHER PUBLICATIONS

International Search Report in corresponding International Application No. PCT/JP2021/042271, dated Feb. 8, 2022 (5 pages).

(Continued)

*Primary Examiner* — Jessica M Merlin
(74) *Attorney, Agent, or Firm* — Osha Bergman Watanabe & Burton LLP

(57) ABSTRACT

A head-up display includes an image generation unit emitting light for generating a predetermined image and a mirror reflecting the light so that a transmission member is irradiated with the light emitted by the image generation unit. The image generation unit includes a light source, an optical member transmitting light from the light source, and a liquid crystal portion in which an original image for forming the predetermined image is generated by the light emitted from the optical member. The original image is formed in a shape corresponding to distortion of the predetermined image. The optical member is formed in a shape matching the shape of the original image.

4 Claims, 9 Drawing Sheets

(51) Int. Cl.
  *B60K 35/21* (2024.01)
  *B60K 35/231* (2024.01)
  *B60K 35/50* (2024.01)
  *B60K 35/80* (2024.01)
(52) U.S. Cl.
  CPC ............ *B60K 35/231* (2024.01); *B60K 35/50* (2024.01); *B60K 35/80* (2024.01); *G02B 2027/013* (2013.01)
(58) Field of Classification Search
  USPC ........................ 359/13–14, 629–633; 349/11
  See application file for complete search history.

(56) References Cited

U.S. PATENT DOCUMENTS

| | | |
|---|---|---|
| 2019/0056086 A1 | 2/2019 | Nambara |
| 2019/0196187 A1 | 6/2019 | Kasazumi et al. |
| 2022/0252899 A1 | 8/2022 | Wu et al. |

FOREIGN PATENT DOCUMENTS

| | | | |
|---|---|---|---|
| JP | 2018-045103 A | | 3/2018 |
| JP | 2020098270 A | * | 6/2020 |
| WO | 2020-233529 A1 | | 11/2020 |

OTHER PUBLICATIONS

Written Opinion in corresponding International Application No. PCT/JP2021/042271, dated Feb. 8, 2022 (4 pages).
Extended European Search Report issued in counterpart European Application No. 21903132.5, dated May 7, 2024 (9 pages).

\* cited by examiner

HEAD-UP DISPLAY

TECHNICAL FIELD

The present disclosure relates to a head-up display.

BACKGROUND ART

In the future, it is expected that there will be a mixture of the vehicles traveling in an automatic operating mode and the vehicles traveling in a manual operating mode on public roads.

Visual communication between vehicles and humans is expected to become increasingly important in the future automatic operating society. For example, visual communication between the vehicle and an occupant is expected to become increasingly important. With respect to this point, the visual communication between the vehicle and the occupant can be realized by using the head-up display (HUD). The head-up display can allow the occupant. to be visually recognized or can realize so-called AR (augmented reality) by projecting an image or a video onto the windshield or the combiner and superimposing the image on an actual space through the windshield or the combiner.

As an example of the head-up display, Patent Literature 1 discloses a display device including an optical system for displaying a three-dimensional virtual image by using a transparent display medium. The display device projects light into a field of view of a driver on the windshield or the combiner. A portion of the projected light is transmitted through the windshield or the combiner, but another portion is reflected by the windshield or the combiner. This reflected light faces the eyes of the driver. The driver perceives the reflected light that enters the eyes of the driver as the background of the actual object seen through the windshield or the combiner and the virtual image seen like an image of an object on the opposite side (outside of the car) with of the windshield or the combiner interposed.

CITATION LIST

Patent Literature

Patent Literature 1: JP2018-45103A

SUMMARY OF INVENTION

Technical Problem

By the way, existing head-up displays have room for improvement of the visibility of virtual images (images).

Therefore, an object of the present disclosure is to provide a head-up display capable of improving visibility of a virtual image.

Solution to Problem

According to an aspect of the present disclosure, there is provided a head-up display configured to display a predetermined image, the head-up display including:
an image generation unit emitting light for generating the predetermined image; and
a mirror reflecting the light so that a transmission member is irradiated with the light emitted by the image generation unit,
in which the image generation unit includes:
a light source;
an optical member transmitting light from the light source; and
a liquid crystal unit in which an original image for forming the predetermined image is generated by the light emitted from the optical member,
in which the original image is formed in a shape corresponding to distortion of the predetermined image, and
in which the optical member is formed in a shape matching the shape of the original image.

In addition, according to another aspect of the present disclosure, there is provided a head-up display configured to display a predetermined image, the head-up display including:
an image generation unit emitting light for generating the predetermined image; and
a mirror reflecting the light so that a transmission member is irradiated with the light emitted by the image generation unit,
in which the image generation unit includes at least:
a plurality of light sources; and
a single optical member transmitting light from each of the plurality of light sources and emitting the light, and
in which the plurality of light sources are disposed at of the mirror so that light emitted from the single optical member is diffused and is incident on the mirror.

Advantageous Effects of Invention

According to the present disclosure, it is possible to provide a head-up display capable of improving visibility of a virtual image.

DESCRIPTION OF EMBODIMENTS

Hereinafter, embodiments of the present invention (hereinafter referred to as the present embodiment) will be described with reference to the drawings. The dimensions of each member illustrated in this drawing may differ from the actual dimensions of each member for convenience of explanation.

In addition, in the description of the present embodiment, for convenience of the description, the terms of "leftward-rightward direction", "upward-downward direction", and "front-back direction" may be referred to as appropriate. These directions are relative directions set for an HUD (head-up display) 20 illustrated in FIG. 2. Herein, the "leftward-rightward direction" is a direction including the "leftward direction" and the "rightward direction". The "upward-downward direction" is a direction that includes the "upward direction" and the "downward direction". The "forward-backward direction" is a direction that includes the "forward direction" and the "backward direction." Although not illustrated in FIG. 2, the leftward-rightward direction is a direction perpendicular to the upward-downward direction and the forward-backward direction.

Figure 1:
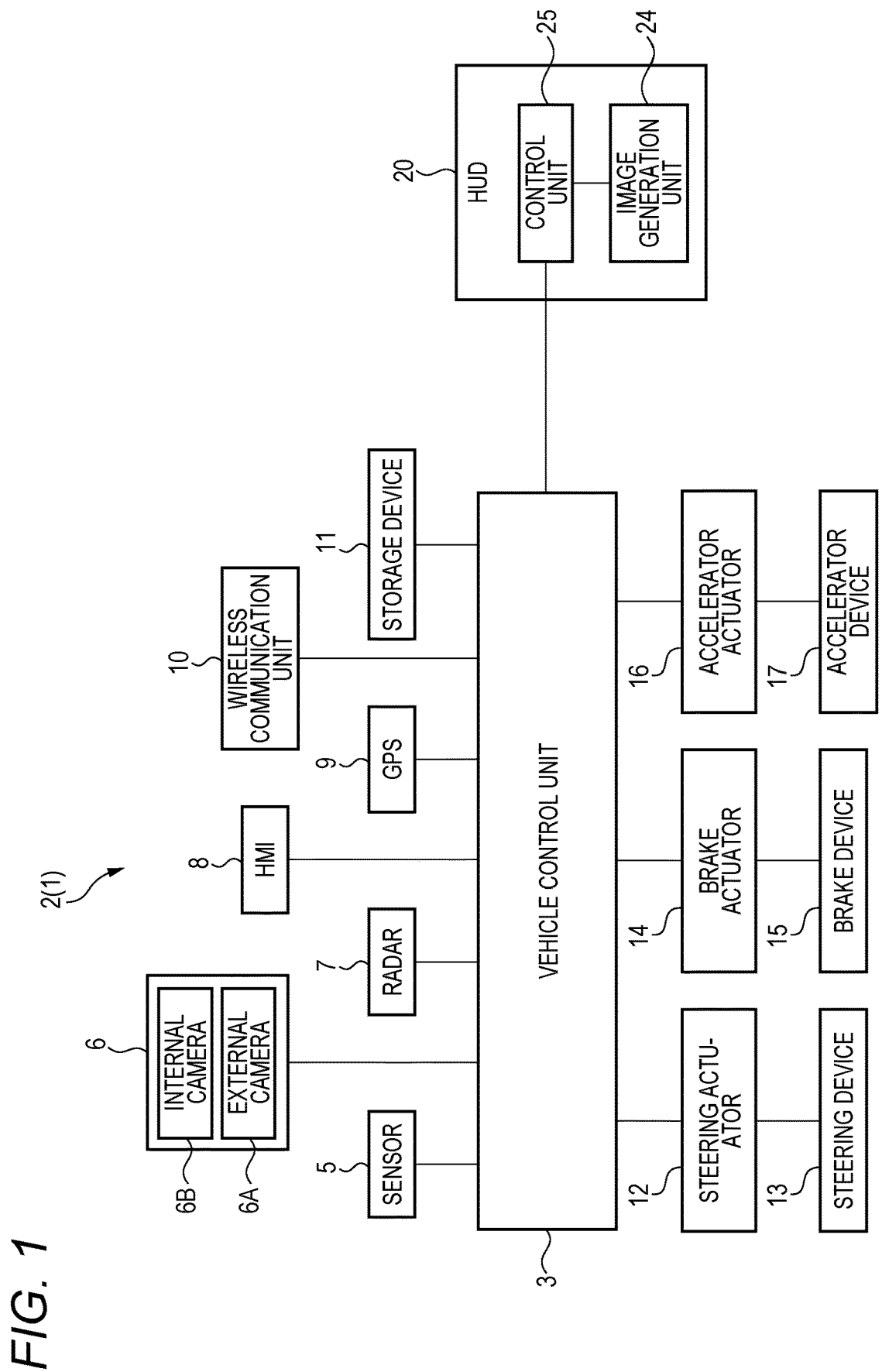
FIG. 1 is a block diagram of a vehicle system provided with a head-up display (HUD) according to an embodiment.

A vehicle system 2 including the HUD 20 according to the present embodiment will be described below with reference to FIG. 1. FIG. 1 is a block diagram of the vehicle system 2. The vehicle 1 provided with the vehicle system 2 is a vehicle (automobile) capable of traveling in an automatic operating mode.

As illustrated in FIG. 1, the vehicle system 2 includes a vehicle control unit 3, a sensor 5, a camera 6, a radar 7, an HMI (human machine interface) 8, a GPS (global positioning system) 9, a wireless communication unit 10, and a storage device 11. In addition, the vehicle system 2 also includes a steering actuator 12, a steering device 13, a brake actuator 14, a brake device 15, an accelerator actuator 16, and an accelerator device 17. Furthermore, the vehicle system 2 has the HUD 20.

The vehicle control unit 3 is configured to control traveling of the vehicle 1. The vehicle control unit 3 is configured with, for example, at least one electronic control unit (ECU). The electronic control unit includes a computer system (for example, SoC (System on a Chip), or the like) including one or more processors and memory, and an electronic circuit configured with active elements such as transistors and passive elements such as resistors. The processor includes, for example, at least one of a CPU (central processing unit), an MPU (micro processing unit), a GPU (graphics processing unit), and a TPU (tensor processing unit). The CPU may be configured with a plurality of CPU cores. The GPU may be configured with a plurality of GPU cores. The memory includes ROM (read only memory) and RAM (random access memory). A vehicle control program may be stored in the ROM. For example, the vehicle control program may include an artificial intelligence (AI) program for automatic operating. The AI program is a program (a learned model) constructed by supervised or unsupervised machine learning (especially deep learning) using multilayer neural networks. The RAM may temporarily store the vehicle control program, vehicle control data and/or surrounding environment information indicating surrounding environment of the vehicle 1. The processor may be configured to load the program designated from various vehicle control programs stored in the ROM onto the RAM and execute various processes in cooperation with the RAM. In addition, the computer system may also be configured with a non-von Neumann computer such as ASIC (application specific integrated circuit) or FPGA (field-programmable gate array). Furthermore, the computer system may be configured with a combination of a von Neumann computer and a non-von Neumann computer.

The sensor 5 includes at least one of an acceleration sensor, a velocity sensor, and a gyro sensor. The sensor 5 is configured to detect the traveling state of the vehicle 1 and output traveling state information to the vehicle control unit 3. The sensors 5 may be further provided with a seating sensor that detects whether the driver is sitting in the driver seat, a face direction sensor that detects the direction of the driver face, an external weather sensor that detects external weather conditions, a human sensor that detects whether or not there is a person in the vehicle, and the like.

The camera 6 is, for example, a camera including an imaging device such as a CCD (charge-coupled device) or a CMOS (complementary MOS). The camera 6 includes an external camera 6A and an internal camera 6B.

The external camera 6A is configured to acquire image data representing the surrounding environment of the vehicle 1 and then transmit the image data to the vehicle control unit 3. The vehicle control unit 3 acquires the surrounding environment information based on the transmitted image data. Herein, the surrounding environment information may include information on objects (pedestrians, other vehicles, marker lights, and the like) existing outside the vehicle 1. For example, the surrounding environment information may include information on the attributes of objects existing outside the vehicle 1 and information on the distances and positions of the objects relative to the vehicle 1. The external camera 6A may be configured as a monocular camera, or may be configured as a stereo camera.

The internal camera 6B is disposed in the vehicle 1 and is configured to acquire image data representing an occupant. The internal camera 6B functions, for example, as an eye tracking camera that tracks the viewpoint E of the occupant (described later with reference to FIG. 2). The internal camera 6B is provided, for example, in the vicinity of a room mirror or in an instrument panel.

The radar 7 includes at least one of a millimeter wave radar, a microwave radar, and a laser radar (for example, a LiDAR unit). For example, the LiDAR unit is configured to detect the surrounding environment of the vehicle 1. In particular, the LiDAR unit is configured to acquire three-dimensional mapping data (point cloud data) representing the surrounding environment of the vehicle 1 and then transmit the three-dimensional mapping data to the vehicle control unit 3. The vehicle control unit 3 specifies the surrounding environment information based on the transmitted three-dimensional mapping data.

The HMI 8 is configured with an input unit that receives an input operation from the driver and an output unit that outputs traveling information and the like to the driver. The input unit includes a steering wheel, an accelerator pedal, a brake pedal, an operating mode switch for switching the operating mode of the vehicle 1, and the like. The output unit is a display (excluding HUD) that displays various traveling information.

The GPS 9 is configured to acquire current location information of the vehicle 1 and output the acquired current location information to the vehicle control unit 3.

The wireless communication unit 10 is configured to receive information on other vehicles around the vehicle 1 (for example, traveling information and the like) from other vehicles and transmit information on the vehicle 1 (for example, traveling information and the like) to the other vehicles configured (vehicle-to-vehicle communication). In addition, the wireless communication unit 10 is configured to receive infrastructure information from infrastructure equipment such as traffic lights and marker lights and to transmit the traveling information of the vehicle 1 to the infrastructure equipment (road-to-vehicle communication). In addition, the wireless communication unit 10 is configured to receive information on the pedestrian from a portable electronic device (a smartphone, a tablet, a wearable device, or the like) carried by the pedestrian and transmit the own vehicle traveling information of the vehicle 1 to the portable electronic device (pedestrian-to-vehicle communication). The vehicle 1 may directly communicate with the other vehicles, the infrastructure equipment, or the portable electronic devices in an ad-hoc mode or may communicate via an access point. Furthermore, the vehicle 1 may communicate with the other vehicles, the infrastructure equipment, or the portable electronic devices via a communication network (not illustrated). The communication network includes at least one of the Internet, a LAN (local area network), a WAN (wide area network), and a RAN (radio access network). Wireless communication standards are, for example, Wi-Fi (registered trade mark), Bluetooth (registered trade mark), ZigBee (registered trade mark), LPWA, DSRC (registered trade mark), or Li-Fi. In addition, the vehicle 1 may communicate with the other vehicles, the infrastructure equipment, or the portable electronic devices using the fifth generation mobile communication system (5G).

The storage device 11 is an external storage device such as an HDD (hard disk drive) or an SSD (solid state drive). The storage device 11 may store two-dimensional map information or three-dimensional map information and/or vehicle control programs. For example, the three-dimensional map information may be configured with three-dimensional mapping data (point cloud data). The storage device 11 is configured to output the map information and the vehicle control program to the vehicle control unit 3 in response to the request from the vehicle control unit 3. The map information and the vehicle control program may be updated via the wireless communication unit 10 and the communication network.

When the vehicle 1 travels in the automatic operating mode, the vehicle control unit 3 automatically generates at least one of a steering control signal, an accelerator control signal, and a brake control signal based on the traveling state information, the surrounding environment information, the current location information, the map information, and the like. The steering actuator 12 is configured to receive the steering control signal from the vehicle control unit 3 and control the steering device 13 based on the received steering control signal. The brake actuator 14 is configured to receive the brake control signal from the vehicle control unit 3 and control the brake device 15 based on the received brake control signal. The accelerator actuator 16 is configured to receive the accelerator control signal from the vehicle control unit 3 and control the accelerator device 17 based on the received accelerator control signal. Thus, the vehicle control unit 3 automatically controls the traveling of the vehicle 1 based on the traveling state information, the surrounding environment information, the current location information, the map information, and the like. That is, in the automatic operating mode, the traveling of the vehicle 1 is automatically controlled by the vehicle system 2.

On the other hand, when the vehicle 1 travels in the manual operating mode, the vehicle control unit 3 generates the steering control signal, the accelerator control signal, and the brake control signal in accordance with manual operations of the driver on the accelerator pedal, the brake pedal, and the steering wheel. Thus, in the manual operating mode, since the steering control signal, the accelerator control signal, and the brake control signal are generated by the manual operations of the driver, at the traveling of the vehicle 1 is controlled by the driver.

As described above, the operating mode includes the automatic operating mode and the manual operating mode. The automatic operating mode includes, for example, the fully automatic operating mode, the advanced operating support mode, and the operating support mode. In the fully automatic operating mode, the vehicle system 2 automatically performs all traveling control including steering control, brake control and accelerator control, and the driver is not in the state where the vehicle 1 can be operated. In the advanced operating support mode, the vehicle system 2 automatically performs all traveling control including the steering control, the brake control, and the accelerator control, and the driver does not operate the vehicle 1 although the vehicle 1 is ready to be operated. In the operating support mode, the vehicle system 2 automatically performs a portion of traveling control out of the steering control, the brake control, and the accelerator control, and the driver operates the vehicle 1 under the operating support of the vehicle system 2. On the other hand, in the manual operating mode, the vehicle system 2 does not automatically perform traveling control, and the driver operates the vehicle 1 without the operating support of the vehicle system 2.

The HUD 20 is configured to display the HUD information as the image facing the occupant of the vehicle 1 so that predetermined information (hereinafter referred to as HUD information) is superimposed on the actual space (in particular, the surrounding environment in front of the vehicle 1) outside the vehicle 1. The HUD information displayed by the HUD includes, for example, the vehicle traveling information related to the traveling of the vehicle 1 and/or the surrounding environment information related to the surrounding environment of the vehicle 1 (in particular, information related to the object existing the outside of the vehicle 1), or the like. The HUD 20 is an AR display that functions as a visual interface between the vehicle 1 and occupants.

The HUD 20 includes an image generation unit 24 and a control unit 25.

The image generation unit (PGU: picture generation unit) 24 is configured to emit light for generating a predetermined image to be displayed to the occupant of the vehicle 1. The image generation unit 24 can emit light for generating a changing image that changes according to a situation of the vehicle 1, for example.

The control unit 25 controls operations of each unit of the HUD 20. The control unit 25 is connected to the vehicle control unit 3 and controls the operations of each unit of the HUD 20 such as the image generation unit 24 based on the vehicle traveling information, the surrounding environment information, and the like transmitted from the vehicle control unit 3. The control unit 25 is provided with the processor such as the CPU and the memory, and the processor executes the computer program read from the memory to control the operations of the image generation unit 24 and the like. In this embodiment, the vehicle control unit 3 and the control unit 25 are provided as separate components, but the vehicle control unit 3 and the control unit 25 may be configured integrally. For example, the vehicle control unit 3 and the control unit 25 may be configured with a single electronic control unit.

Figure 2:
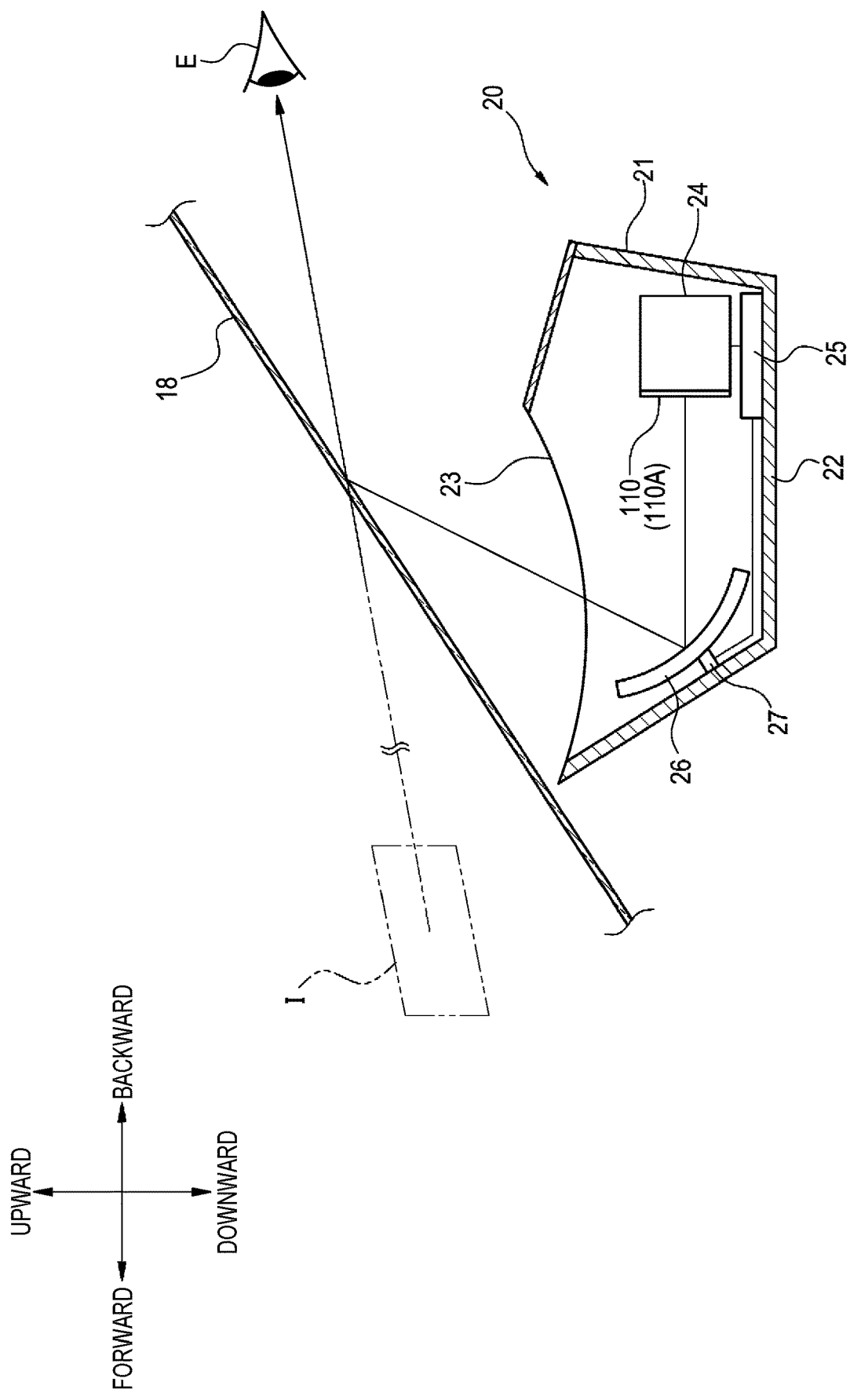
FIG. 2 is a schematic diagram illustrating a configuration of the HUD of FIG. 1.

FIG. 2 is a schematic diagram of the HUD 20 viewed from the side of the vehicle 1. At least a portion of the HUD 20 is located in the vehicle 1. Specifically, the HUD 20 is provided at a predetermined location in the vehicle 1. For example, the HUD 20 may be located in a dashboard of the vehicle 1.

As illustrated in FIG. 2, the HUD 20 has an HUD body unit 21. The HUD body unit 21 has a body housing 22 and a light emission window 23. The light emission window 23 is configured with a transparent plate transmitting visible light. The HUD body unit 21 includes an image generation unit 24, a control unit 25, and a concave mirror 26 (an example of the mirror) in the body housing 22.

The image generation unit 24 is provided in the body housing 22 so as to face the front of the HUD 20. The image generation unit 24 has a light emission surface 110 (an example of the liquid crystal unit) emitting light for generating an image toward the outside. The light emission surface 110 is provided with a predetermined light emission region 110A emitting light for generating the predetermined image to be displayed to the occupant of the vehicle 1. The predetermined light emission region 110A will be described later with reference to FIG. 4.

The concave mirror 26 is disposed on an optical path of the light emitted from the image generation unit 24. The concave mirror 26 is configured to reflect the light emitted from the image generation unit 24 toward a windshield 18 (for example, the front window of the vehicle 1). The concave mirror 26 has a reflection surface curved in a concave shape to form the predetermined image and reflects the image of the light emitted from the image generation unit 24 and formed into an image at predetermined magnification. The concave mirror 26 may have, for example, a drive mechanism 27 and may be configured to change the position and orientation of the concave mirror 26 based on the control signal transmitted from the control unit 25.

The control unit 25 generates the control signal for controlling the operations of the image generation unit 24 based on the vehicle traveling information, the surrounding environment information, and the like transmitted from the vehicle control unit 3 and transmits the generated control signal to the image generation unit 24. In addition, the control unit 25 may generate the control signal for changing the position and orientation of the concave mirror 26 and transmit the generated control signal to the drive mechanism 27.

The light emitted from the light emission surface 110 of the image generation unit 24 is reflected by the concave mirror 26 and emitted from the light emission window 23 of the HUD body unit 21. The windshield 18 which is the transmission member is irradiated with the light emitted from the light emission window 23 of the HUD body unit 21. A portion of the light with which the windshield 18 is irradiated from the light emission window 23 is projected into the viewpoint E of the occupant. As a result, the occupant recognizes the light emitted from the HUD body unit 21 as the virtual image (predetermined image) formed at the predetermined distance in front of the windshield 18. As a result of the image displayed by the HUD 20 being superimposed on the actual space in front of the vehicle 1 through the windshield 18 in this way, the occupant can visually recognize a virtual image object I formed by the predetermined image to remain on the road outside the vehicle.

Herein, the viewpoint E of the occupant may be either the viewpoint of the left eye or the viewpoint of the right eye of the occupant. Alternatively, the viewpoint E may be defined as the midpoint of a line segment connecting the viewpoint of the left eye and the viewpoint of the right eye. The position of the viewpoint E of the occupant is specified based on, for example, the image data acquired by the internal camera 6B. The position of the viewpoint E of the occupant may be updated at a predetermined period or may be determined only once when the vehicle 1 is started.

When forming a two-dimensional image (planar image) as the virtual image object I, the predetermined image is projected so as to be the virtual image at the single distance determined freely. When forming a three-dimensional image (stereoscopic image) as the virtual image object I, the plurality of predetermined images that are the same as or different from each other are projected so as to be virtual images at different distances. In addition, the distance of the virtual image object I (the distance from the viewpoint E of the occupant to the virtual image) can be appropriately adjusted by adjusting the distance from the image generation unit 24 to the viewpoint E of the occupant (for example, by adjusting the distance between the image generation unit 24 and the concave mirror 26).

Incidentally, since the light emitted from the light emission surface 110 of the image generation unit 24 is reflected by the concave mirror 26, the distortion occurs in the virtual image object I recognized by the occupant as the predetermined image due to the reflection by the concave mirror 26. Therefore, it is desirable, for example, to correct the distortion of the virtual image object I that occurs in order to allow the occupant to accurately recognize the information of the virtual image object I.

Next, distortion occurring in the virtual image object and processing for correcting the distortion (correction by warping of the image) will be described with reference to FIGS. 3A, 3B, 4, and 5.

Figure 3A:
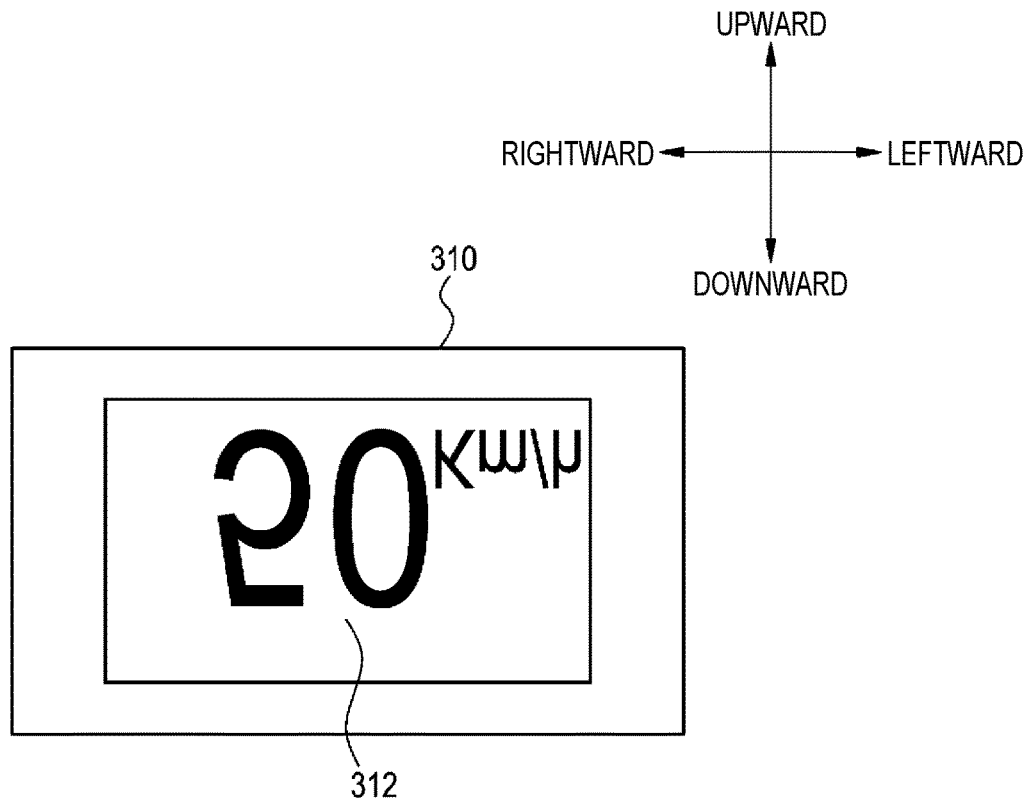
FIG. 3A is a diagram illustrating an example of a light emission surface image generated by an image generation unit of an HUD according to Comparative Example.
Figure 3B:
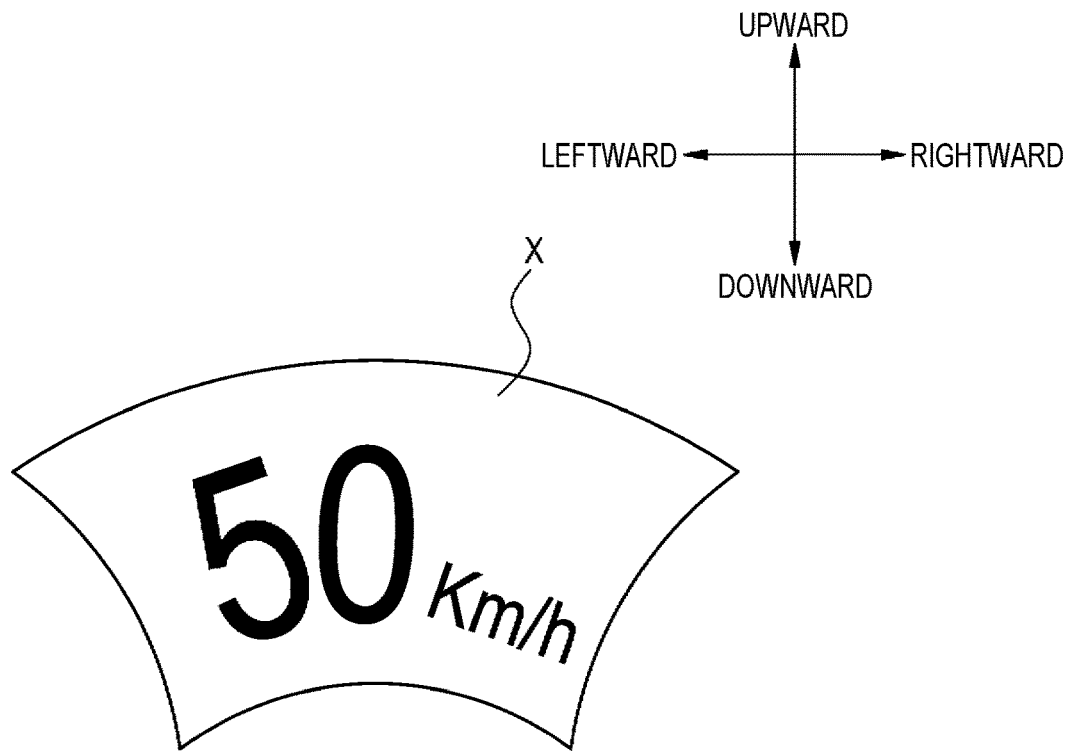
FIG. 3B is a diagram when the light emission surface image illustrated in FIG. 3A is displayed as a virtual image.

FIG. 3A is a diagram illustrating an example of, as the image generated by the light emitted from the image generation unit of the HUD according to Comparative Example, the image on the light emission surface 310 of the image generation unit, that is, an image (hereinafter referred to a light emission surface image) 312 generated by the light before being reflected by the concave mirror. In addition, FIG. 3B is a diagram illustrating a virtual image object X recognized by the occupant as the predetermined image after the light emission surface image 312 illustrated in FIG. 3A is reflected by the concave mirror. It is noted that information indicating a traveling speed (50 km/h) of the own vehicle is displayed in the images illustrated in FIGS. 3A and 3B.

As illustrated in FIG. 3A, when the light emission surface image 312 on the light emission surface 310 of the image generation unit according to Comparative Example is a normal image, for example, an image on which a predetermined correction process with respect to the distortion caused by being reflected by the concave mirror is not performed, the virtual image object X generated by the light reflected by the concave mirror is visually recognized as an image having a distorted shape, as illustrated in FIG. 3B. In the case of Comparative Example, the virtual image object X is visually recognized as the curved image in which the upper side is elongated and the lower side is contracted.

On the other hand, in the image generation unit 24 of the HUD 20 according to the present embodiment, in order to correct the distortion of the image caused by being reflected by the concave mirror 26, an inverse correction process (also called correction process by warping) is performed on the light emission surface image in advance) is performed.

Figure 4:
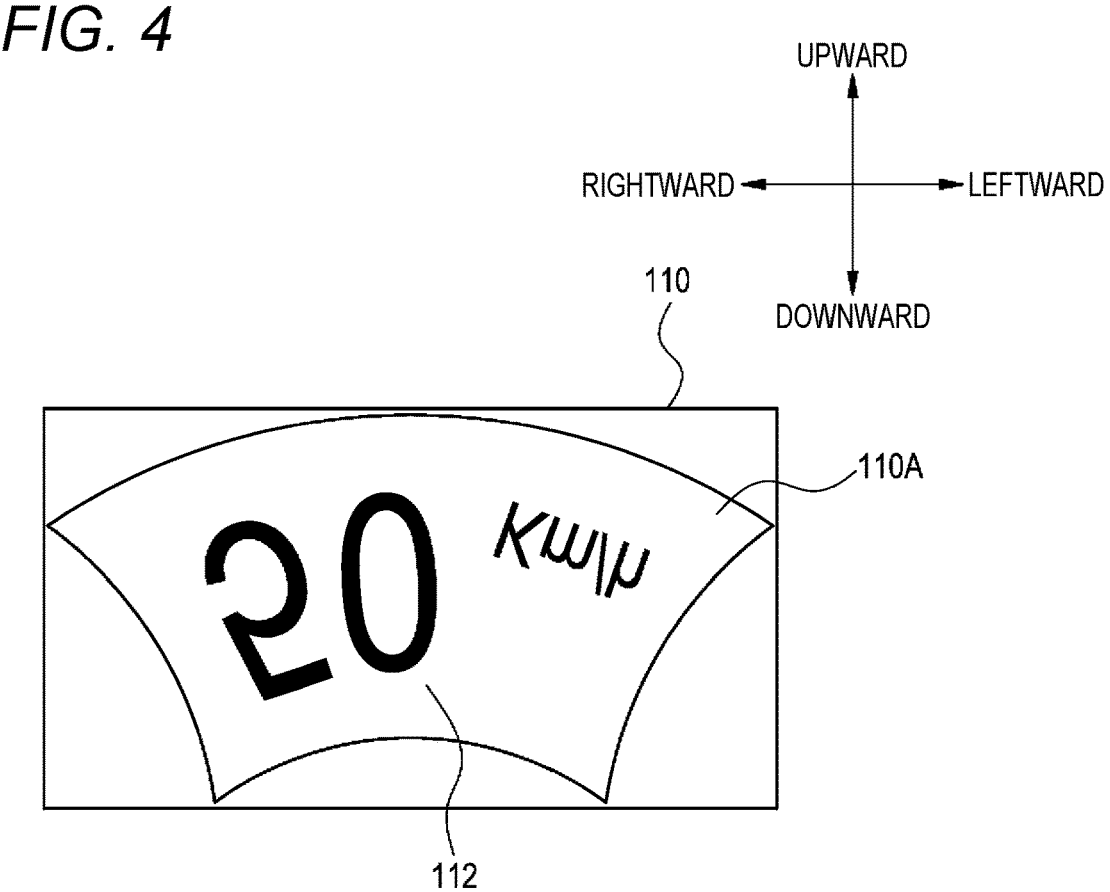
FIG. 4 is a diagram illustrating an example of a light emission surface image generated by an image generation unit of the HUD according to the present embodiment.
Figure 5:
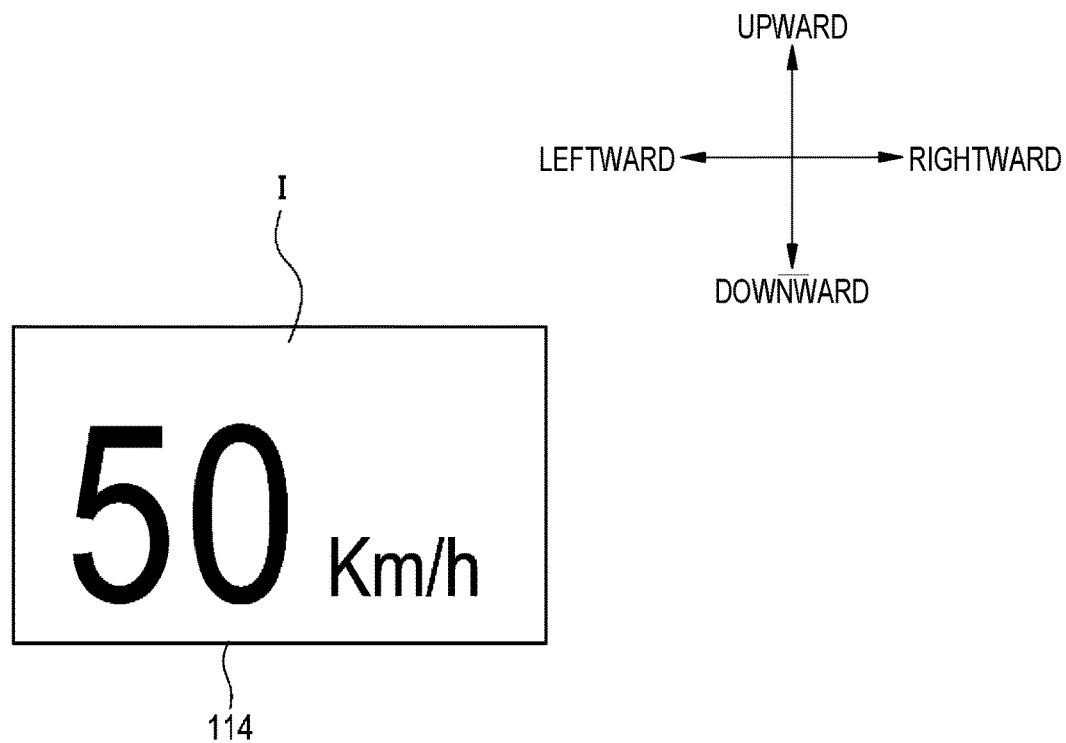
FIG. 5 is a diagram illustrating a virtual image object recognized when the light emission surface image illustrated in FIG. 4 is reflected by a concave mirror.

FIG. 4 is a diagram illustrating an example of a light emission surface image 112 generated by the light emitted from the image generation unit 24 of the HUD 20. FIG. 5 is a diagram illustrating the virtual image object I recognized by the occupant as the predetermined image after the light emission surface image 112 illustrated in FIG. 4 is reflected by the concave mirror 26.

As illustrated in FIG. 4, the light emission surface 110 of the image generation unit 24 is formed in a rectangular shape and is provided with the predetermined light emission region 110A for emitting light for generating the predetermined image. The light emission surface image 112 is generated in the predetermined light emission region 110A by the light emitted from the predetermined light emission region 110A. In the light emission surface image 112 of this example, similarly to Comparative Example illustrated in FIGS. 3A and 3B, a speed image is displayed to notify that a current traveling speed is 50 km/h, The predetermined light emission region 110A of the rectangular light emission surface 110 is formed, for example, as an annular fan-shaped light emission region. The annular fan-shaped predetermined light emission region 110A is a light emission region forming a rectangular display range 114 in which the virtual image object I illustrated in FIG. 5 is displayed. The predetermined light emission region 110A is formed, for example, so as to occupy a region in which the annular fan shape is maximized on the light emission surface 110 in order to form the large display range 114.

In the examples illustrated in FIGS. 4 and 5, a correction process by warping is performed on the light emission surface image 112 of the predetermined light emission region 110A. In order to correct the distortion caused by the reflection from the concave mirror 26, the light emission surface image 112 of the predetermined light emission region 110A is corrected in advance by extending the upper side of the image by the amount distorted by the reflection of the concave mirror 26 and is corrected by shrinking the lower side of the image.

As can be seen from the virtual image object X in FIG. 3B, for example, a degree of distortion generated in the virtual image object I based on the reflection by the concave mirror 26 decreases as it approaches the central region of the virtual image object I and increases as the end region is away from the central region. For this reason, the correction amount by warping performed on the light emission surface image 112, which is the original image of the virtual image object I, differs depending on the position of the light emission surface image 112 corresponding to the magnitude of the degree of distortion according to the portion of the virtual image object I. For example, the correction amount of the light emission surface image in the region corresponding to the center of the virtual image object I is relatively small, and the correction amount of the light emission surface image in the region corresponding to the end away from the center of the virtual image object I is relatively large.

As described above, the light emission surface image 112, which is the original image for forming the predetermined image, is formed in a shape on which an inverse correction process is performed so as to be distorted in the opposite direction in advance by the amount distorted due to the reflection by the concave mirror 26. For this reason, as illustrated in FIG. 5, when the light that generates the light emission surface image 112 is reflected by the concave mirror 26, a horizontally-long rectangular virtual image object I without distortion is visually recognized.

First Embodiment

Next, an HUD 20A according to a first embodiment will be described with reference to FIGS. 6 and 7.

Figure 6:
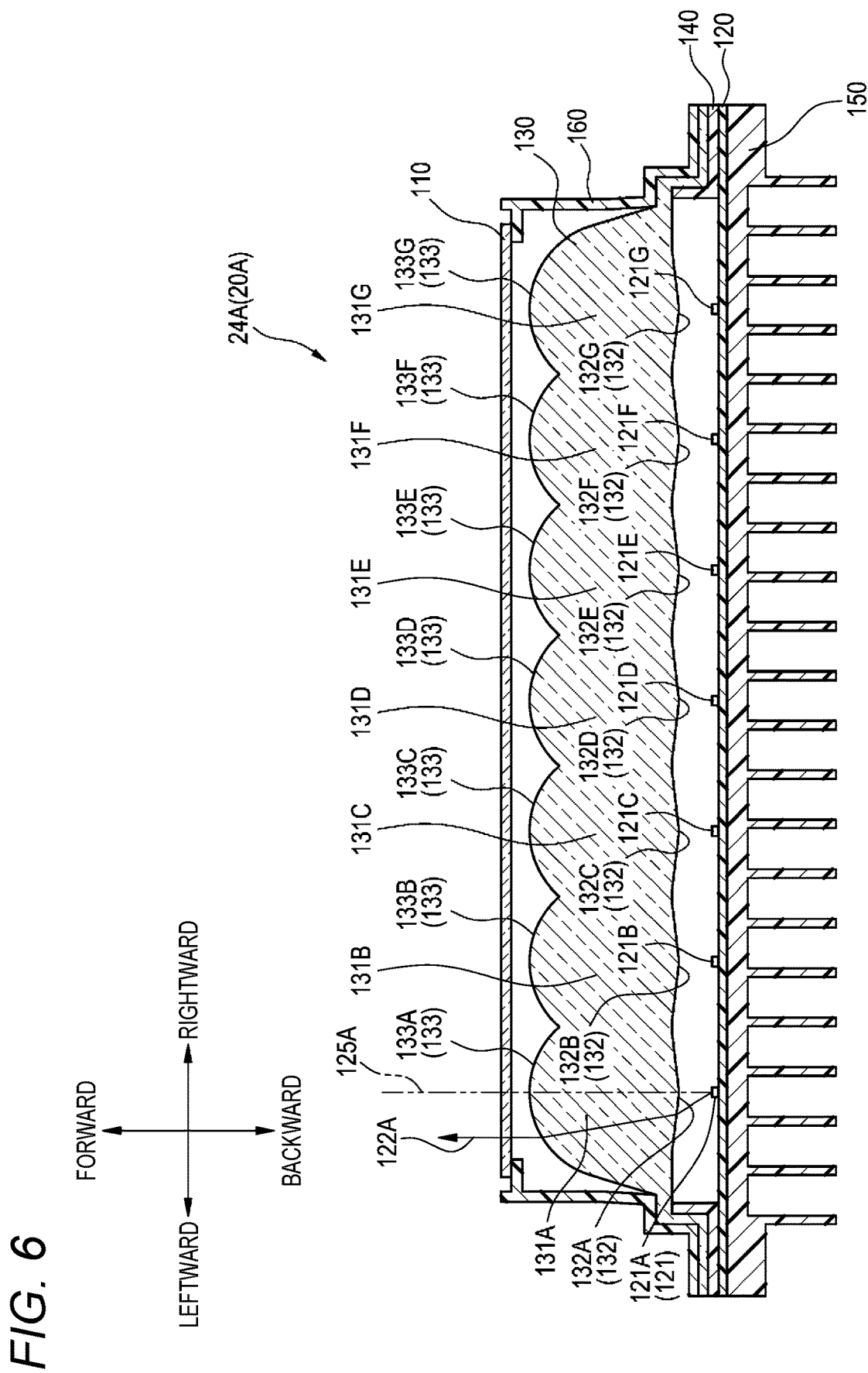
FIG. 6 is a horizontal cross-sectional view of the image generation unit provided in the HUD of the first embodiment.

FIG. 6 is a horizontal cross-sectional view of an image generation unit 24A provided in the HUD 20A. FIG. 7 is a schematic diagram of the image generation unit 24A viewed from the front side (light emission surface 110 side).

As illustrated in FIG. 6, the image generation unit 24A includes a light source board 120 on which a plurality of light sources 121 (in this example, seven light sources including a first light source 121A to a seventh light source 121G) are mounted, a lens 130 (an example of an optical member) disposed at the front side of the light source 121, and a light emission surface 110 disposed on the front side of the lens 130. The image generation unit 24A further includes a lens holder 140 disposed on the front side of the light source board 120, a heat sink 150 disposed on the back side of the light source board 120, and a PGU housing 160.

The light source 121 (first light source 121A to the seventh light source 121G) is, for example, a laser light source or an LED light source. The laser light source is, for example, an RGB laser light source configured to emit red laser light, green light laser light, and blue laser light, respectively. The first light source 121A to the seventh light source 121G are disposed on the light source board 120 to be away a certain distance in the leftward-rightward direction. The light source board 120 is, for example, a printed circuit board made of an insulator in which electrical circuit wiring is printed on a surface or inside of the board.

The lens 130 has an incident surface 132 on which light from the light source 121 is incident and a light emission surface 133 from which the incident light is emitted. The lens 130 is, for example, an aspherical convex lens in which both the incident surface 132 and the light emission surface 133 have convex surface shapes. The lens 130 is configured to transmit or reflect the light emitted from light source 121 to emit the light toward the light emission surface 110. A prism, a diffusion plate, a magnifying glass, and the like may be appropriately added to the lens 130 functioning as an optical member.

The lens 130 is configured by disposing the seven aspherical convex lenses corresponding to the first light source 121A to the seventh light source 121G in parallel in the leftward-rightward direction. Portions of adjacent aspherical convex lenses of the lens 130 are combined in parallel. The lens 130 has a first region 131A transmitting the first light emitted from the first light source 121A, a second region 131B transmitting the second light emitted from the second light source 121B, a third region 131C transmitting the third light emitted from the third light source 121C, a fourth region 131D transmitting the fourth light emitted from the fourth light source 121D, a fifth region 131E transmitting the fifth light emitted from the fifth light source 121E, a sixth region 131F transmitting the sixth light emitted from the sixth light source 121F, and a seventh region 131G transmitting the seventh light emitted from the seventh light source 121G. An incident surface 132A of the first region 131A, an incident surface 132B of the second region 131B, an incident surface 132C of the third region 131C, an incident surface 132D of the fourth region 131D, an incident surface 132E of the fifth region 131E, an incident surface 132E of the sixth region 131F. and an incident surface 132G of the seventh region 131G are incident surfaces convex backward. A light emission surface 133A of the first region 131A, a light emission surface 133B of the second region 131B, a light emission surface 133C of the third region 131C, a light emission surface 133D of the fourth region 131D, a light emission surface 133E of the fifth region 131E, a light emission surface 133E of the sixth region 131F, and a light emission surface 133G of the seventh region 131G are light emission surfaces convex forward. The lens 130 is attached to the lens holder 140 so that the centers of the light emission surfaces of the first light source 121A to the seventh light source 121G are the respective focal positions.

The light emission surface 110 is a liquid crystal display, a DMD (digital mirror device), or the like. The light emission surface 110 forms light for generating an image with the light of the light source 121 passing through the lens 130. The light emission surface 110 is attached to a front surface portion of the PGU housing 160 with the light emission surface facing the front of the image generation unit 24A. The drawing method of the image generation unit 24A may be a raster scan method, a DLP method, or an LCOS method. When the DLP method or the LCOS method is adopted, the light source 121 of the image generation unit 24A may be an LED light source. It is noted that, when the liquid crystal display method is adopted, the light source 121 of the image generation unit 24A may be a white LED light source.

The lens holder 140 holds the lens 130 in the PGU housing 160 so that the light emitted from the light source 121 is correctly incident on the incident surface 132 of the lens 130.

The heat sink 150 is made of aluminum, copper, or the like, which has high thermal conductivity. The heat sink 150 is provided so as to be in contact with the back surface of the light source board 120 in order to radiate heat generated from the light source board 120.

The lights emitted from the first light source 121A to the seventh light source 121G are incident on the incident surfaces 132A to 132G of the lens 130, respectively. Since the shape of the lens 130 is a shape in which the seven aspherical convex lenses are combined in parallel as described above, most of the light emitted from the first light source 121A is incident on the first region 131A of the lens 130 to be light parallel to an optical axis 125A as illustrated for example in a first optical path 122A and is emitted from the first region 131A to be incident on the light emission surface 110. Although illustration is omitted, similarly, most of the lights emitted from the second light source 121B to the seventh light source 121G are incident on the second region 131B to the seventh region 131G, respectively, to be lights parallel to respective axes of the second light source 121B to the seventh light source 121G and are incident on the light emission surface 110.

Figure 7:
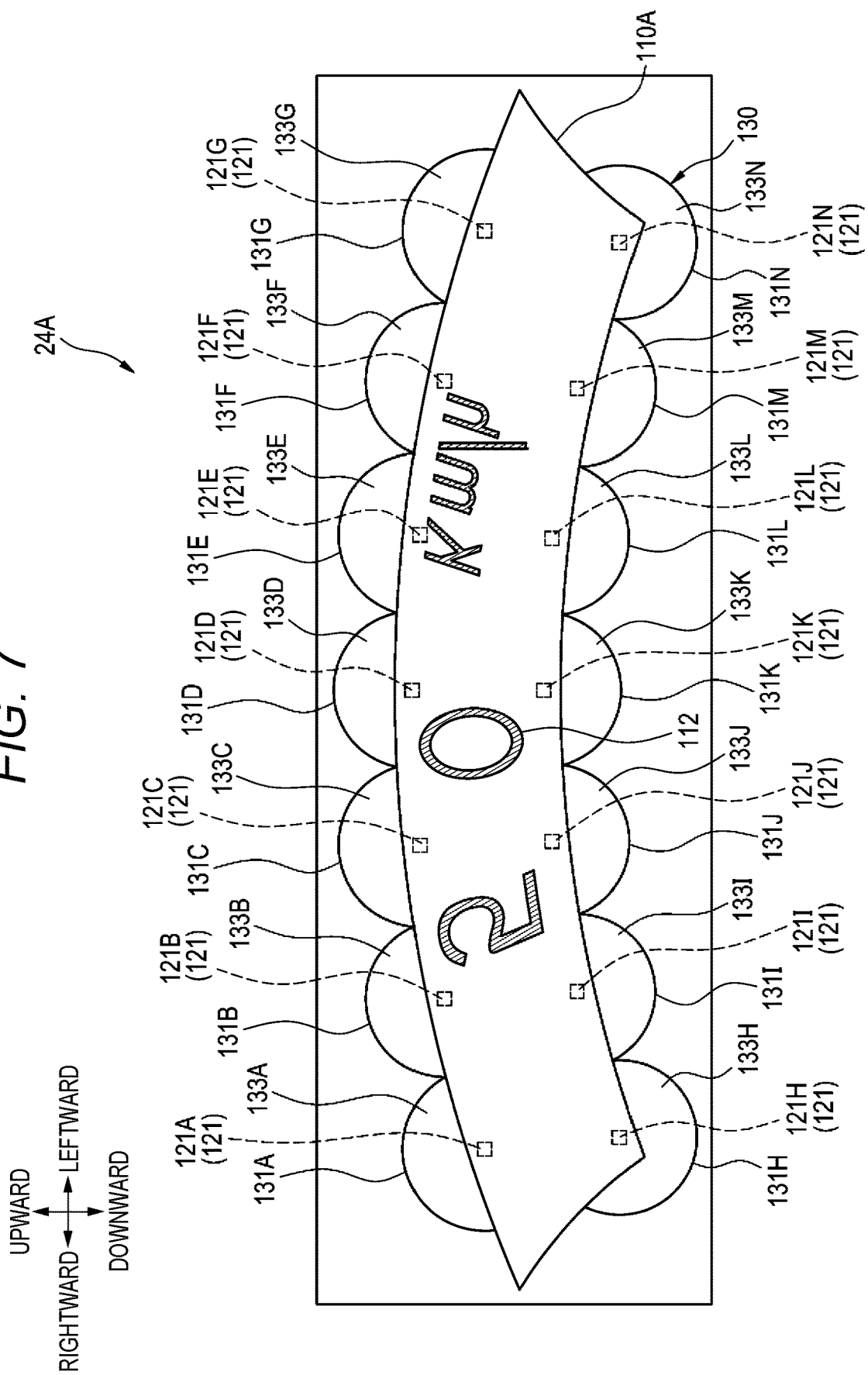
FIG. 7 is a schematic view of the image generation unit of FIG. 6 as viewed from the front side.

As illustrated in FIG. 7, the lens 130 is formed by stacking seven aspherical convex lenses disposed in parallel in the leftward-rightward direction corresponding to the light sources in the plurality of stages in the upward-downward direction. The lens 130 of this example is formed by staking the first region 131A to the seventh region 131G (an example of the convex surface portion) disposed in parallel in the leftward-rightward direction corresponding to the first light source 121A to the seventh light source 121G and the eighth region H to the fourteenth region 131N (an example of the convex surface portion) disposed in parallel in the leftward-rightward direction corresponding to the eighth light source 121H to the fourteenth light source 121N in two stages in the upward-downward direction. It is to be noted that each light source 121 indicated by a broken line is disposed behind the lens 130.

The annular fan-shaped predetermined light emission region 110A is formed on the light emission surface 110, and thus, the light emission surface image (50 km/h) 112, which is an original image of the predetermined image forming the virtual image object I, is generated in the predetermined light emission region 110A. Then, the correction process by warping is performed on the light emission surface image 112.

The lens 130, in which the first region 131A to the seventh region 131G and the eighth region 131H to the fourteenth region 131N are stacked in two stages in the upward-downward direction, is formed to have a shape matching the shape of the light emission surface image 112 on which the correction process by warping is performed. Specifically, the lens 130 is formed in a curved-line shape matching the shape of the light emission surface image 112 on which the corrected by warping is performed. The first region 131A to the seventh region 131G of the lens 130 are disposed so that a virtual lines connecting the respective centers of the light emission surface 133A to the light emission surface 133G are curved line as viewed from the front. Similarly, the eighth region 131H to the fourteenth region 131N of the lens 130 are disposed so that the virtual lines connecting the respective centers of the light emission surface 133H to the light emission surface 133N are curved lines as viewed from the front.

In addition, in the first light source 121A to the seventh light source 121G corresponding to the first region 131A to the seventh region 131G are disposed so that the virtual lines connecting these light sources are curved lines to match of the shape of the light emission surface image 112 corrected by warping. Similarly, the eighth light source 121H to the fourteenth light source 121N corresponding to the eighth region 131H to the fourteenth region 131N are also disposed so that the virtual lines connecting these light sources are curved lines.

Among the first region 131A to the seventh region 131G in the lens 130, the fourth region 131D which is disposed in the central portion is a lens emitting light for forming the central region of the light emission surface image 112. In addition, among the first region 131A to the seventh region 131G, the first region 131A and the seventh region 131G which are disposed at the ends away from the central portion are lenses emitting for forming the end regions of the light emission surface image 112. Similarly, among the eighth region 131H to the fourteenth region 131N in the lens 130, the eleventh region 131K which is disposed in the central portion is a lens emitting light for forming the central region of the light emission surface image 112. In addition, among the eighth region 131H to the fourteenth region 131N, the eighth region 131H and the fourteenth region 131N which are disposed at the end portions away from the central portion are lenses emitting light for forming the end regions of the light emission surface image 112.

As described above, the degree of distortion occurring in the virtual image object I based on the reflection by the concave mirror 26 decreases as the virtual image object I approaches the central region, and the degree of distortion increases as the end region is away from the central region. For this reason, the correction amount by warping performed on the light emission surface image 112, which is the original image of the virtual image object I, becomes small in the region corresponding to the center of the virtual image object I in the light emission surface image 112 and becomes large in the region corresponding to the end away from the center of the virtual image object I in the light emission surface image 112.

It is preferable that the first region 131A to the fourteenth region 131N of the lens 130 are formed so that there is a difference between the region emitting the light for forming the central region of the light emission surface image 112 and the region emitting the light for forming the surrounding region of the light emission surface image 112. For example, the first region 131A to the fourteenth region 131N may be configured so that there is a difference in curvature of the light emission surfaces 133A to 133N according to the degree of distortion generated in each region (each of the central region, the end region, and the intermediate region) of the virtual image object I based on the reflection by the concave mirror 26.

As described above, the HUD 20A according to the first embodiment includes the image generation unit 24A emitting light for generating the predetermined image and the concave mirror 26 for reflecting the light emitted by the image generation unit 24A, with which the windshield 18 is irradiated. The image generation unit 24A includes the light source 121, the lens 130 transmitting the light from the light source 121, and the light emission surface 110A of the light emission surface 110 on which the original image for forming the predetermined image is generated by the light emitted from the lens 130. The original image is formed in a shape corresponding to the distortion of the predetermined image, and the lens 130 is formed in a shape matching the shape of the original image. Specifically, the light emission surface image 112, which is the original image, is formed in advance in a shape so as correct the distortion of the predetermined image caused by the reflection of the light emission surface image 112 by the concave mirror 26. The lens 130 is formed in a shape matching the shape of the light emission surface image 112 as viewed from the light emission surface 110 side. In addition, in order to correct the distortion of the image caused by the reflection by the concave mirror 26 of the light emission surface image 112 (original image) displayed in the predetermined light emission region 110A of the light emission surface 110, an inverse correction process (correction process by warping) is performed in advance on the light emission surface image 112 to be displayed on light emission region 110A. According to the configuration of the HUD 20, since the shape of the lens 130 (the first region 131A to the seventh region 131G and the eighth region 131H to the fourteenth region 131N) is formed matching the shape of the light emission surface image 112, a utilization efficiency of the light emitted from the light source with respect to the predetermined light emission region 110A in which the light emission surface image 112 corrected by warping is displayed can be improved. As a result, the visibility of the virtual image object I can be improved.

In addition, according to the HUD 20A, the shape of the lens 130 is a curved-line shape. When the rectangular virtual image object I is desired to be displayed toward the occupant, it is preferable that the light emission surface image 112 (original image) is formed in a curved-line shape in consideration of the correction process by warping. The utilization efficiency of the light emitted from the lens 130 toward the predetermined light emission region 110A of the light emission surface 110 by forming the lens 130 in the curved-line shape matching the curved-line shape of the light emission surface image 112 can be easily improved.

In addition, according to the HUD 20A, the light source 121 includes the first light source 121A to the fourteenth light source 121N, and the lens 130 includes the first region 131A to the fourteenth region 131N, which are the plurality of convex surface portions transmitting the light from the first light source 121A to the fourteenth light source 121N, respectively. The first light source 121A to the seventh light source 121G and the eighth light source 121H to the fourteenth light source 121N are disposed on a curved line as viewed from the light emission surface 110 side, and the first region 131A to the seventh region 131G and the eighth region 131H to the fourteenth region 131N are disposed on a curved line as viewed from the light emission surface 110 side. According to this configuration, since the plurality of light sources and the plurality of convex surface portions are used, the utilization efficiency of the light emitted to the predetermined light emission region 110A of the light emission surface 110 can be improved even when, for example, a large-sized virtual image object I is displayed.

In addition, according to the HUD 20A, the predetermined image (virtual image object I) is formed in a horizontally-long rectangular shape, and a degree of distortion of end regions of the predetermined image is larger than a degree of distortion of a central region of the predetermined image. Then, according to a difference between the degree of distortion of the central region and the degree of distortion of the end regions, there is a difference in shape between the convex surface portion disposed corresponding to the central region and the convex surface portion disposed corresponding to the end regions among the first region 131A to the fourteenth region 131N, which are the plurality of convex surface portions. The end regions of the virtual image object I are more likely to be distorted due to reflection by the concave mirror 26 than the central region. Therefore, by allowing the shape of the convex surface portion (for example, the fourth region 131D and the eleventh region 131K) disposed on the central side and the shape of the convex surface portion (for example, the first region 131A, the seventh region 131G, the eighth region 131H, and the fourteenth region 131N) disposed on the end sides to be different from each other, the image distortion can be appropriately corrected.

Second Embodiment

An HUD 20B according to a second embodiment will be described with reference to FIGS. 8 and 9.

Figure 8:
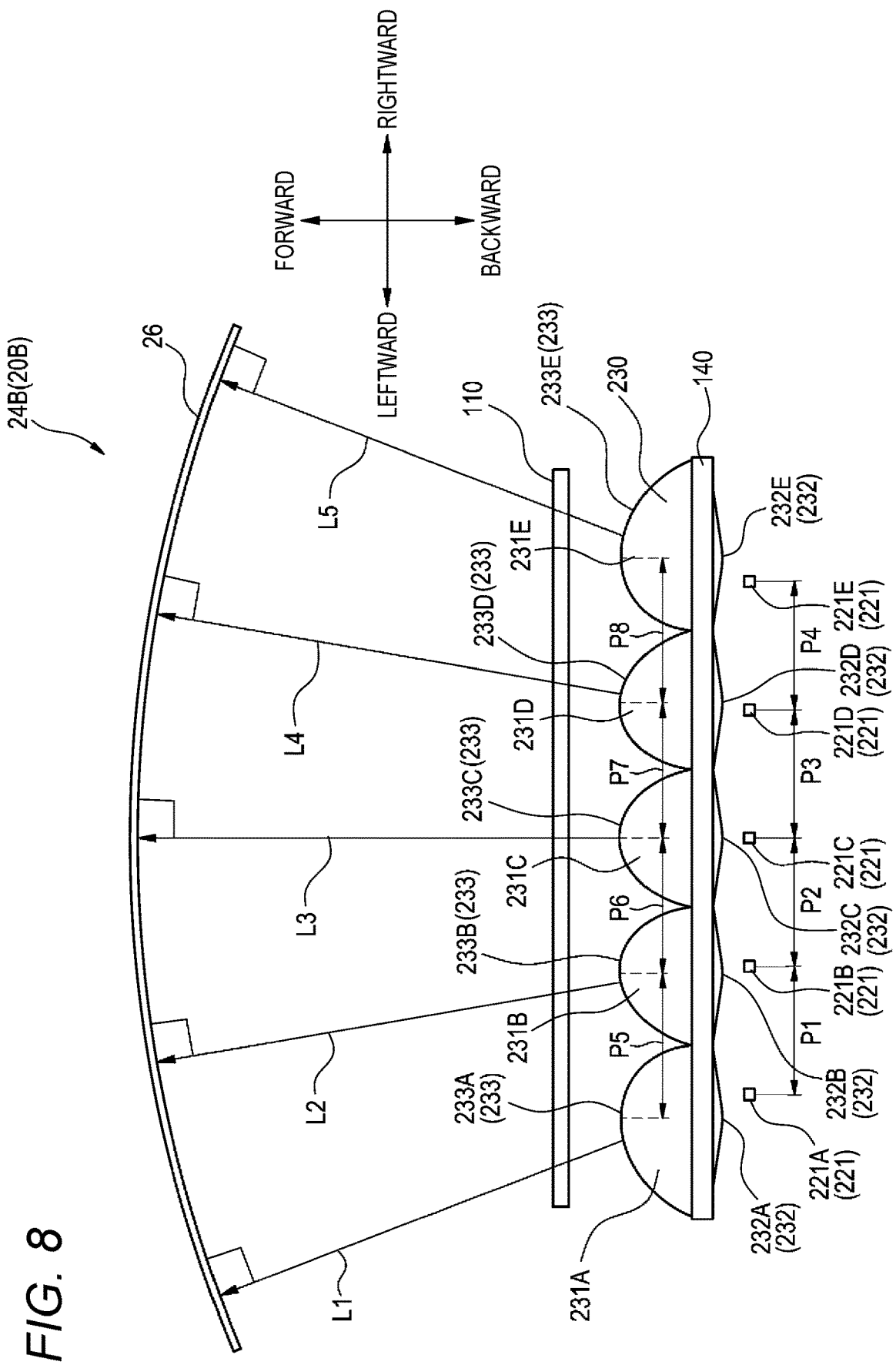
FIG. 8 is a schematic view of an image generation unit provided in an HUD of a second embodiment as viewed from the above.

FIG. 8 is a schematic diagram of an image generation unit 24B provided in the HUD as viewed from the above. As illustrated in FIG. 8, similarly to the image generation unit 24A of the first embodiment, even in the case of the image generation unit 24B, a plurality of light sources and lenses configured to correspond to these light sources are provided. In the example illustrated in FIG. 8, five light sources of a first light source 221A to a fifth light source 221E are provided. The first light source 221A to the fifth light source 221E are disposed in parallel in the leftward-rightward direction. The lens 230 is a single lens obtained by disposing five aspherical convex lenses corresponding to the first light source 221A to the fifth light source 221E in parallel in the leftward-rightward direction and combining portions of the adjacent aspherical convex lenses in parallel.

The lens 230 has a first region 231A transmitting a first light emitted from the first light source 221A, a second region 231B transmitting a second light emitted from a second light source 221B, a third region 231C transmitting a third light emitted from a third light source 221C, a fourth region 231D transmitting a fourth light emitted from a fourth light source 221D, and a fifth region 231E transmitting a fifth light emitted from a fifth light source 221E. An incident surface 232A of the first region 231A, an incident surface 232B of the second region 231B, an incident surface 232C of the third region 231C, an incident surface 232D of the fourth region 231D, and an incident surface 232E of the fifth region 231E are incident surfaces that are convex backward. A light emission surface 233A of the first region 231A, a light emission surface 233B of the second region 231B, a light emission surface 233C of the third region 231C, a light emission surface 233D of the fourth region 231D, and a light emission surface 233E of the fifth region 231E are light emission surfaces that are convex forward.

It is to be noted that the members having the same reference numerals as those of the image generation unit 24A of the first embodiment have the same functions, and the description thereof will be omitted as appropriate.

The first light source 221A to the fifth light source 221E are disposed at a pitch matching the shape of the concave mirror 26 so that the light being irradiated from the first light source 221A to the fifth light source 221E, passing through the lens 230, and being emitted from the light emission surface 233 of the lens 230 is diffused toward the concave mirror 26 to move forward. The light sources are disposed so that pitches P1 to P4 of the first light source 221A to the fifth light source 221E are shorter than pitches P5 to P8 of the vertices of the light emission surfaces 233A to 233E of the lens 230.

For example, the pitch P1 between the first light source 221A and the second light source 221B is shorter than the pitch P5 between the vertex of the light emission surface 233A of the first region 231A and the vertex of the light emission surface 233B of the second region 231B in the lens 230. Similarly, the pitch P2 between the second light source 221B and the third light source 221C is shorter than the pitch P6 between the vertex of the light emission surface 233B of the second region 231B and the vertex of the light emission surface 233C of the third region 231C of the lens 230. The pitch P3 between the third light source 221C and the fourth light source 221D is shorter than the pitch P7 between the vertex of the light emission surface 233C of the third region 231C and the vertex of the light emission surface 233D of the fourth region 231D. of the lens 230. The pitch P4 between the fourth light source 221D and the fifth light source 221E is shorter than the pitch P8 between the vertex of the light emission surface 233D of the fourth region 231D and the vertex of the light emission surface 233E of the fifth region 231E of the lens 230.

The first light source 221A to the fifth light source 221E are disposed so that the light emitted from the light emission surface 233 of the lens 230, with which the concave mirror 26 is irradiated from the first light source 221A to the fifth light source 221E and passes through the lens 230 is substantially perpendicular incident on the concave mirror 26. For example, the first light source 221A to the fifth light source 221E are disposed so that the light passing through the optical axis of the lens 230 or the light passing through a path close to the path of the light passing through the optical axis is substantially perpendicularly incident on the concave mirror 26.

For example, the first light source 221A is disposed so that a light L1 passing through the optical axis in the first region 231A or a path close to the path of the light passing through the optical axis among the light being irradiated from the first light source 221A, passing through the first region 231A of the lens 230, and being emitted from the light emission surface 233A is substantially perpendicularly incident on the concave mirror 26. Similarly, the second light source 221B is disposed so that a light L2 passing through the optical axis in the second region 231B or a path close to the path of the light passing through the optical axis among the light being irradiated from the second light source 221B, passing through the second region 231B of the lens 230, and being emitted from the light emission surface 233B is substantially perpendicularly incident on the concave mirror 26. The third light source 221C is disposed so that a light L3 passing through the optical axis in the third region 231C or a path close to the path of the light passing through the optical axis among the light being irradiated from the third light source 221C, passing through the third region 231C of the lens 230, and being emitted from the light emission surface 233C is substantially perpendicularly incident on the concave mirror 26. The fourth light source 221D is disposed so that a light L4 passing through the optical axis in the fourth region 231D or a path close to the path of the light passing through the optical axis among the light being irradiated from the fourth light source 221D, passing through the fourth region 231D of the lens 230, and being emitted from the light emission surface 233D is substantially perpendicularly incident on the concave mirror 26. The fifth light source 221E is disposed so that a light L5 passing through the optical axis in the fifth region 231E or a path close to the path of the light passing through the optical axis is substantially perpendicularly incident on the concave mirror 26 among the light which the light emission surface 233E is irradiated with from the fifth light source 221E, passes through the fifth region 231E of the lens 230, and is emitted from the light emission surface 233E.

Furthermore, the first region 231A to the fifth region 231E (examples of the convex surface portions) of the lens 230 are formed so that there is a difference in shape between the region emitting the light for forming the central region of the light emission surface image and the region emitting the light for forming the surrounding region of the light emission surface image. For example, the shape of the third region 231C which emits light for forming the central region of the light emission surface image, is formed so as is symmetrical in the leftward-rightward direction among the first region 231A to the fifth region 231E. On the other hand, the shapes of the first region 231A, the second region 231B, the fourth region 231D, and the fifth region 231E that emit light for forming the surrounding region of the light emission surface image are formed so as to be asymmetrical in the leftward-rightward direction. The degree of the asymmetry is larger in the regions that emit the light for forming ends of the light emission surface image. In the first region 231A, the second region 231B, the fourth region 231D, and the fifth region 231E, the degree of the asymmetry of the first region 231A and the fifth region 231E is larger than the degree of the asymmetry of the second region 231B and the fourth region 231D.

Figure 9:
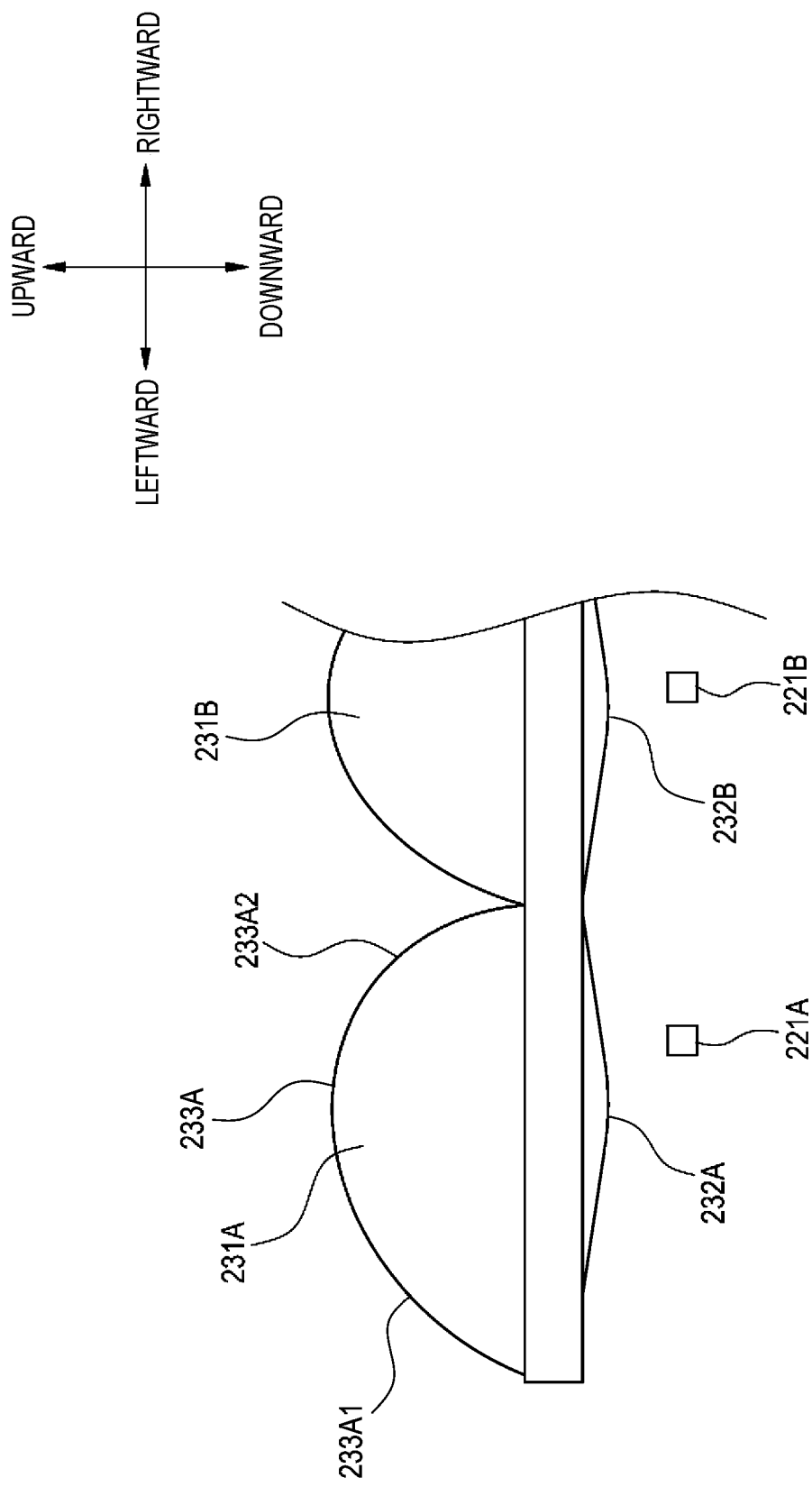
FIG. 9 is a partially enlarged view illustrating a shape of a lens provided in the image generation unit of FIG. 8.

FIG. 9 is a diagram illustrating the asymmetry of the shape of the first region 231A in the lens 230. As illustrated in FIG. 9, the first region 231A is disposed so that the inclination (degree of curvature) of a curved surface 233A1 on the left side (the side farther from the second region 231B) in the light emission surface 233A is gentler than the inclination (degree of curvature) of a curved surface 233A2 on the right side (the side closer to the second region 231B) in the light emission surface 233A. That is, the light emission surface 233A is formed so that the curvature of the curved surface 233A1 on the left side is smaller than the curvature of the curved surface 233A2 on the right side. Although not illustrated, similarly, the second region 231B is formed so that the curvature of the light emission surface 233B on the side closer to the first region 231A is smaller than the curvature of the light emission surface 233B on the side closer to the third region 231C. A difference in curvature between the left side and the right side of the light emission surface is formed so that the curvature of the light emission surface 233A of the first region 231A is larger than the curvature of the light emission surface 233B of the second region 231B.

On the other hand, although illustration is omitted, the fifth region 231E is formed so that the curvature of the light emission surface 233E on the right side (the side farther from the fourth region 231D) is smaller than the curvature of the light emission surface 233E. on the left side (the side closer to the fourth region 231D). In addition, the fourth region 231D is formed so that the curvature of the light emission surface 233D closer to the fifth region 231E is smaller than the curvature of the light emission surface 233D closer to the third region 231C. A difference in curvature between the left side and the right side of the light emission surface is formed so that the curvature of the light emission surface 233E of the fifth region 231E is larger than the curvature of the light emission surface 233D of the fourth region 231D.

Although FIG. 8 illustrates the image generation unit 24B viewed from the above, similarly, the shape of the lens may be changed for each region even when the image generation unit 24B is, for example, viewed from the left side or the right side)/For example, when the lens has the plurality of convex surface portions stacked in the upward-downward direction, the shape of the convex surface portion for emitting light for forming the central region of the light emission surface image and the shape of the convex surface portion for emitting light for forming the upper and lower end regions of the light emission surface image may be allowed to be different from each other.

Figure 10:
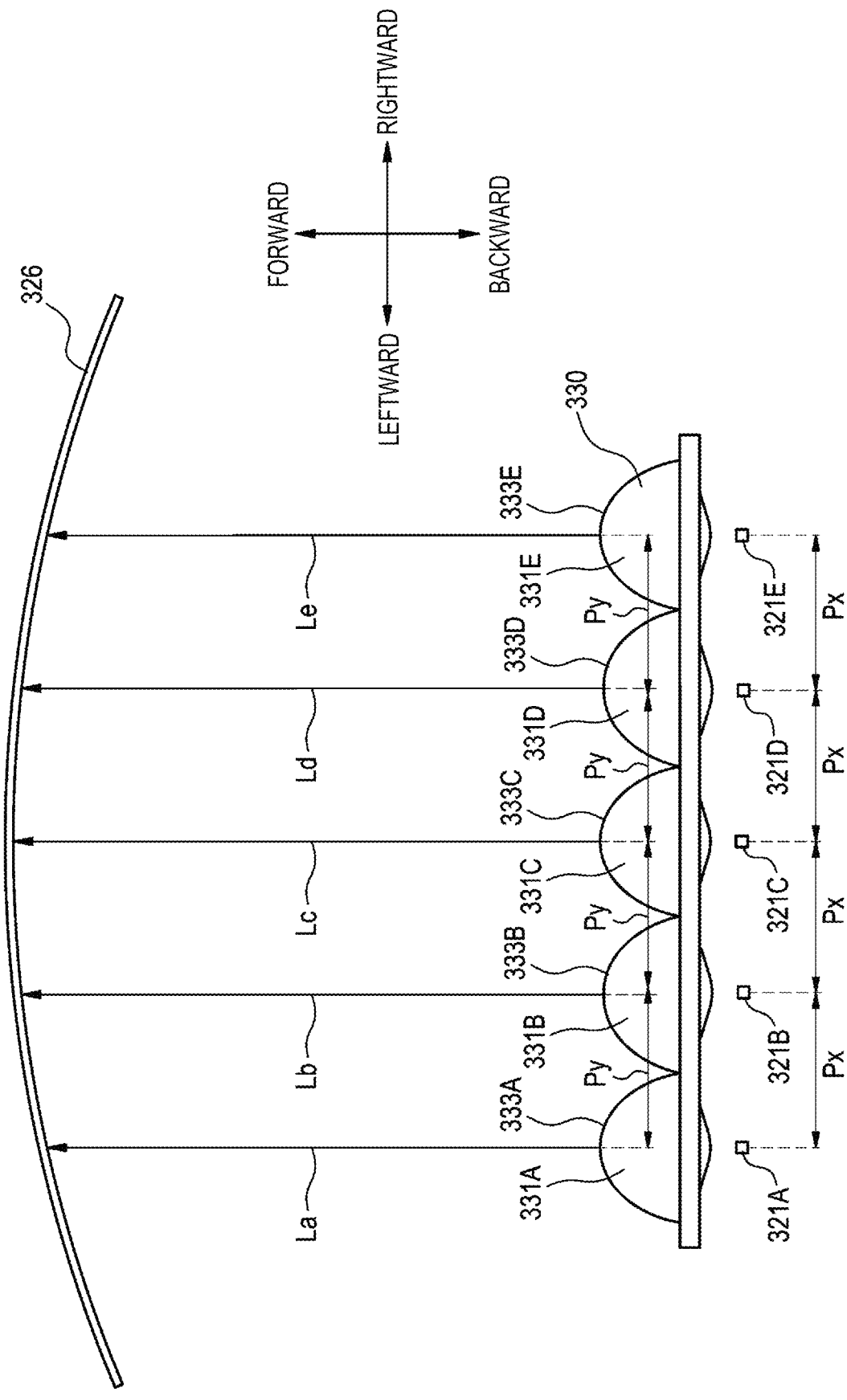
FIG. 10 is a schematic top view of an image generation unit provided in an HUD of the related art.

By the way, in an image generation unit mounted on the HUD, of the related art, for example, as illustrated in FIG. 10, a pitch Py between the vertices of the (convex surface portion) was the same pitch. In addition, the curvatures of light emission surfaces 333A to 333E are set so that the lights La to Le emitted from a first region 331A to a fifth region 331E are parallel to the optical axes of light sources 321A to 321E. However, in the case of such a configuration, since the amount of light emitted toward the surrounding portion of the concave mirror 326 is reduced, there is a problem that the luminance of the surrounding virtual image portion of the virtual image object generated by the reflected light of the concave mirror 326 is reduced. In order to suppress the luminance reduction of the surrounding virtual image portion, in an example of the related art, for example, a diffusion lens for diffusing the light La to Le emitted from the first region 331A to the fifth region 331E has be required to be added.

On the other hand, the HUD 20B according to the second embodiment includes the image generation unit 24B emitting the light for generating the predetermined image the concave mirror 26 for reflecting the light so that the windshield 18 is irradiated with the light emitted by the image generation unit 24B. The image generation unit 24A includes at least the first light source 221A to the fifth light source 221E and the single lens 230 transmitting the light from the first light source 221A to the fifth light source 221E, and the first light source 221A to the fifth light source 221E are disposed at the pitch matching the shape of the concave mirror 26 so that the light emitted from the single lens 230 is diffused and is incident on the concave mirror 26. According to this configuration, the uniformity of a luminance distribution of the virtual image object I generated by the reflected light of the concave mirror 26 can be improved by allowing the diffused light to be incident on the concave mirror 26 from the single lens 230. As a result, the visibility of the virtual image object I can be improved. In addition, since the optical member for obtaining diffused light can be configured with the single lens 230, there is no need to add the separate member such as a diffusion plate, and the size and the cost of the HUD 20B can be reduced.

In addition, with this configuration of the HUD 20B, the single lens 230 has the first region 231A to the fifth region 231E of the lens 230 which are the plurality of convex surface portions disposed in parallel along a parallel direction of the first light source 221A to the fifth light source 221E so as to emit light from each of the first light source 221A to the fifth light source 221E. The first light source 221A to the fifth light source 221E are disposed so that the pitch of the first light source 221A to the fifth light source 221E is shorter than the pitch of the respective vertices of the first region 231A to the fifth region 231E of the lens 230. According to this configuration, when the pitch between the light sources is allowed to be equal to the pitch between the vertices of the light emission surface (convex surface) of the lens, the light emitted from each of the regions 231A to 231E of the lens 230 toward the concave mirror 26 can be diffused. Accordingly, the uniformity of the luminance distribution of the virtual image object I can be improved.

In addition, with this configuration of the HUD 20B, the light emitted from each of the first region 231A to the fifth region 231E of the lens 230 is configured to be perpendicularly incident on the concave mirror 26. With this configuration, since light can be uniformly reflected on the entire concave mirror 26, the uniformity of the luminance distribution of the virtual image object I can be further improved.

In addition, with this configuration of the HUD 20B, the predetermined image (virtual image object I) is formed in a horizontally-long rectangular shape, and the shape of the region emitting the light to form the center of the predetermined image and the shape of the region emitting the light to form the end of the predetermined image are allowed to be different from each other among the first region 231A to the fifth region 231E of the lens 230 which are the plurality of convex surface portions disposed in parallel. According to this configuration, even the light for forming the end of the predetermined image can be incident on the concave mirror 26 in the substantially perpendicular state, and the uniformity of the luminance distribution of the virtual image object I can be further improved.

While the embodiments of the present invention have been described above, it goes without saying that the technical scope of the present invention should not be limitedly interpreted by the description of the embodiments. It should be understood by those skilled in the art that this embodiment is merely an example, and that various modifications of the embodiment are possible within the scope of the invention described in the claims. The technical scope of the present invention should be determined based on the scope of the invention described in the claims and their equivalents.

The above-described embodiment has the configuration where the windshield 18 is irradiated with the light emitted from the image generation units 24 (24A and 24B) that is reflected by the concave mirror 26, but the configuration is not limited to this. For example, the combiner (not illustrated) provided in the windshield 18 may be irradiated with the light reflected by the concave mirror 26. The combiner is configured with the transmission member, for example, the transparent plastic disc. The portion of the light emitted from the image generation unit 24 of the HUD body unit 21, with which the combiner is irradiated, is projected into the viewpoint E of the occupant in the same manner as when the windshield 18 is irradiated with light.

In addition, in the above-described embodiment, the case where the HUD is mounted on the vehicle has been described, but the present invention is not limited thereto. For example, the HUD may be mounted on a motorcycle, a railroad, an aircraft, or the like.

In addition, in the above-described embodiment, it is described that the vehicle operating mode includes the fully automatic operating mode, the advanced operating support mode, and the operating support mode, and the operating mode of the vehicle should not be limited to four modes. The operating modes of the vehicle may include at least one of these four modes. For example, only one of the operating modes of the vehicle may be executable.

In addition, classification and a display form of operating modes of a vehicle may be appropriately changed in accordance with the laws and regulations related to automatic operation in each country. Similarly, the definitions of the "fully automatic operating mode", the "advanced operating support mode", and the "operating support mode" described in the description of the present embodiment are only examples, and laws and regulations related to the automatic operation in each country may be changed as appropriate.

This application is based on Japanese Patent Application No. 2020-204214 filed on Dec. 9, 2020, the contents of which are incorporated herein by reference.

The invention claimed is:

1. A head-up display configured to display a predetermined image, the head-up display comprising:
   an image generation unit emitting light for generating the predetermined image; and
   a mirror reflecting the light so that a transmission member is irradiated with the light emitted by the image generation unit,
   wherein the image generation unit includes at least:
   a plurality of light sources;
   a single optical member including a plurality of convex surface portions for transmitting light from each of the plurality of light sources and emitting the light; and
   a liquid crystal unit in which an original image for forming the predetermined image is generated by the light emitted from the single optical member,
   wherein
   the plurality of convex surface portions includes a central portion which emits light for forming a central region of the original image and a surrounding portion which emits light for forming a surrounding region of the original image;
   the surrounding portion includes a first curved surface farther from the central portion and a second curved surface closer to the central portion; and
   the curvature of the first curved surface is smaller than the curvature of the second curved surface.

2. The head-up display according to claim 1,
   wherein the plurality of convex surface portions disposed in parallel along a parallel direction of the plurality of light sources, and
   wherein the plurality of light sources are disposed so that a pitch of the plurality of light sources is shorter than a pitch of each vertex of the plurality of convex surface portions.

3. The head-up display according to claim 2, wherein the light emitted from each of the plurality of convex surface portions is configured to be perpendicularly incident on the mirror.

4. The head-up display according to claim 2,
   wherein the predetermined image is formed in a horizontally-long rectangular shape, and
   wherein a shape of the convex surface portion emitting light for forming the central region of the predetermined image and a shape of the convex surface portion emitting light for forming the end region of the predetermined image are allowed to be different from each other among the plurality of juxtaposed convex surface portions.

* * * * *